United States Patent
Yu et al.

(10) Patent No.: US 8,004,569 B2
(45) Date of Patent: Aug. 23, 2011

(54) METHOD AND APPARATUS FOR OBTAINING STILL IMAGE FRAME WITH ANTI-VIBRATION CLEARNESS FOR IMAGE PROCESSING DEVICE

(75) Inventors: Chih-Shih Yu, Hsinchu County (TW); Chun-Yu Chen, Jhubei (TW); Chih-Ying Tu, Jhubei (TW)

(73) Assignee: Alpha Imaging Technology Corporation, Jhubei (TW)

( * ) Notice: Subject to any disclaimer, the term of this patent is extended or adjusted under 35 U.S.C. 154(b) by 457 days.

(21) Appl. No.: 12/010,529

(22) Filed: Jan. 25, 2008

(65) Prior Publication Data

US 2008/0284861 A1    Nov. 20, 2008

(30) Foreign Application Priority Data

May 16, 2007 (TW) .............................. 96117490 A

(51) Int. Cl.
*H04N 5/228* (2006.01)
(52) U.S. Cl. ................................ 348/208.4; 348/208.99
(58) Field of Classification Search ................. 714/6.2, 714/702, 722, 766, 773; 348/208.99, 205, 348/208.1–208.6, 208.14, 208.13
See application file for complete search history.

(56) References Cited

U.S. PATENT DOCUMENTS

| 5,642,430 | A  | * | 6/1997  | Greer et al.      | 382/100   |
|-----------|----|---|---------|-------------------|-----------|
| 7,031,531 | B1 | * | 4/2006  | Saiga et al.      | 382/232   |
| 7,280,149 | B2 | * | 10/2007 | Weintroub et al.  | 348/349   |
| 2004/0169768 | A1 |  | 9/2004 | Lee et al.        |           |
| 2005/0151858 | A1 | * | 7/2005 | Nozaki et al.     | 348/231.9 |
| 2005/0206734 | A1 | * | 9/2005 | Kubo et al.       | 348/207.1 |
| 2006/0158523 | A1 | * | 7/2006 | Estevez et al.    | 348/208.4 |
| 2007/0091196 | A1 |  | 4/2007 | Miyanohara        |           |

FOREIGN PATENT DOCUMENTS

| JP | 2003124914 A | 4/2003 |
| TW | 200412786    | 7/2004 |

* cited by examiner

*Primary Examiner* — Lin Ye
*Assistant Examiner* — Euel K Cowan
(74) *Attorney, Agent, or Firm* — Rabin & Berdo, P.C.

(57) ABSTRACT

A method for obtaining a still image frame with anti-vibration clearness includes the following steps. Multiple raw image frames are captured during a capturing period according to a capturing instruction. The raw image frames are compressed respectively, according to a predetermined compression rule, into multiple compressed image frames each of which has a data length after such compression. The compressed image frames are stored according to a predetermined sequence. The data lengths of the compressed image frames stored are compared according to the predetermined sequence. The desired still image frame is obtained through the compressed image frame of which the data length has a unique feature among all the compressed image frames.

9 Claims, 3 Drawing Sheets

METHOD AND APPARATUS FOR OBTAINING STILL IMAGE FRAME WITH ANTI-VIBRATION CLEARNESS FOR IMAGE PROCESSING DEVICE

This application claims the benefit of Taiwan application Serial No. 96117490, filed May 16, 2007, the subject matter of which is incorporated herein by reference.

BACKGROUND OF THE INVENTION

1. Field of the Invention

The invention relates in general to a method and an apparatus for obtaining a still image frame with anti-vibration clearness, and more particularly to a method and an apparatus for obtaining clear image frames with anti-vibration function.

2. Description of the Related Art

When using a digital image capture device such as a digital camera, the user usually takes an unclear image frame due to hand-shaking. In order to reduce occurrence of unclear image frames due to the vibration of the digital camera, the digital camera is usually equipped with vibration reduction function.

The digital camera in the market achieves vibration reduction purpose by various techniques. One of the techniques is to successively capture a number of image frames, respectively analyze the real context of each whole image frame, and then select and output one of the image frames according to the analyses. However, it requires an extra device to analyze each whole image frame, e.g. to analyze sharpness of edges of each image frame, and thus causes an increase in the cost.

SUMMARY OF THE INVENTION

The invention is directed to a method and an apparatus for obtaining a still image frame with anti-vibration clearness. A clearer image frame is selected from a number of image frames according to the data lengths of corresponding compressed image frames to achieve the vibration reduction purpose.

According to a first aspect of the present invention, a method for obtaining a still image frame with anti-vibration clearness is provided. The method includes the following steps. Multiple raw image frames are captured during a capturing period under a capturing instruction. The raw image frames are compressed respectively, according to a predetermined compression rule, into multiple corresponding compressed image frames each of which has a data length after such compression. The compressed image frames are stored according to a predetermined sequence. The data lengths of the compressed image frames stored are compared according to the predetermined sequence. The desired still image frame is obtained through the compressed image frame of which the data length has a unique feature among all the compressed image frames.

According to a second aspect of the present invention, an apparatus for obtaining a still image frame with anti-vibration clearness is provided. The apparatus for obtaining a still image frame with anti-vibration clearness includes an image capture unit, an image compression unit and an image selection unit. The image capture unit is for capturing multiple raw image frames during a capturing period under a capturing instruction. The image compression unit is for compressing the raw image frames respectively, according to a predetermined compression rule, into multiple corresponding compressed image frames each of which has a data length after such compression. The image selection unit is for storing the compressed image frames according to a predetermined sequence, comparing the data lengths of the compressed image frames stored according to the predetermined sequence, and obtaining the desired still image frame through the compressed image frame of which the data length has a unique feature among all the compressed image frames.

The invention will become apparent from the following detailed description of the preferred but non-limiting embodiments. The following description is made with reference to the accompanying drawings.

DETAILED DESCRIPTION OF THE INVENTION

The invention is directed to a method and an apparatus for obtaining a still image frame with anti-vibration clearness. The clearness of the image frames is determined according to the data lengths of corresponding compressed image frames and thus a clearer image frame is selected from the image frames to achieve the vibration reduction purpose.

Figure 1:
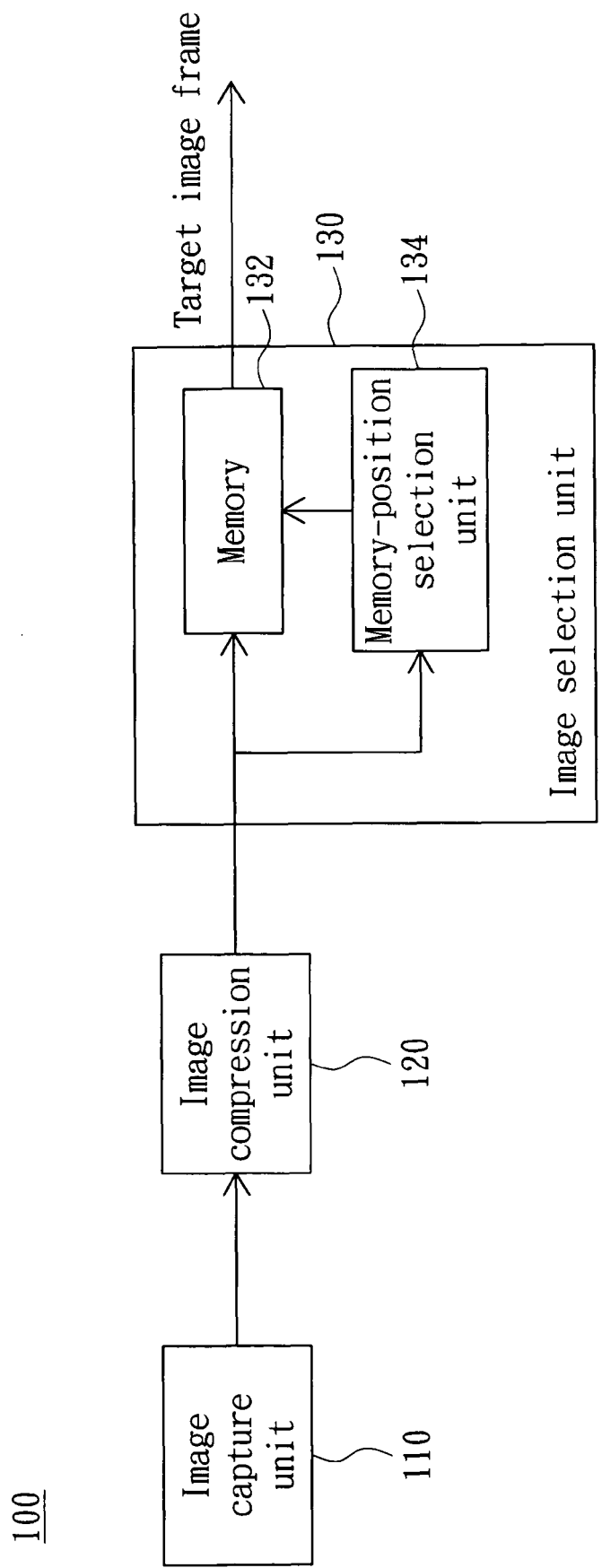
FIG. 1 is a block diagram of an apparatus for obtaining a still image frame with anti-vibration clearness according to a preferred embodiment of the invention.

Referring to FIG. 1, a block diagram of an apparatus for obtaining a still image frame with anti-vibration clearness according to a preferred embodiment of the invention is shown. The apparatus for obtaining a still image frame with anti-vibration clearness 100, such as a digital camera or digital video camera, includes an image capture unit 110, an image compression unit 120 and an image selection unit 130. The image capture unit 110, such as a photoelectric light sensor, is used for capturing multiple raw image frames during a capturing period under a capture instruction. The raw image frames may be captured within the capturing period as the apparatus 100 is under haphazard and narrow-range. The raw image frames, which may be unclear, have slightly different contents.

The image compression unit 120 receives a raw image frame and then compresses the image frame to obtain a corresponding compressed image frame according to a predetermined compression rule. The image compression unit 120 may compress the image frame into the corresponding compressed image frame according to a static image compression standard JPEG. The compressed image frame has a data length after such compression, and the data length is directly proportional to the clearness of the raw image frame. The clearer the raw image frame is, the more high-frequency components the raw image frame has and the larger the data length is. On the contrary, the less clear the raw image frame is, the less high-frequency components the raw image frame has and the smaller the data length is.

The image selection unit 130 substantially determines the clearness of the raw image frame according to the data length of the corresponding compressed image frame. That is, the data length of the corresponding compressed image frame is used as an index for determining the vibration level and the clearness of the raw image frame is determined according to the data length. Furthermore, when the image capture unit 110 performs an operation of capturing image frames under the capturing instruction, the image compression unit 120 can perform a compression operation on a single raw image frame immediately after captured by the image capture unit 110 or a number of raw image frames captured by the image capture unit 110 within the capturing period.

The image selection unit 130 stores the compressed image frames according to a predetermined sequence, which is alternative and rolling forward. Furthermore, the image selection unit 130 compares the data lengths of the compressed image frames stored according to the predetermined sequence, and obtains the desired still image frame through the compressed image frame of which the data length has a unique feature among all the compressed image frames.

The image selection unit 130 includes a memory 132 and a memory-position selection unit 134. The memory 132 includes a first register and a second register (both not shown in the figure) and is for temporarily storing the compressed image frames. The memory-position selection unit 134 compares the data length of the compressed image frame stored in the first register with the data length of the compressed image frame stored in the second register to determine which of the first register and the second register the next compressed image frame should be stored in.

For example, a first compressed image frame is stored in the first register and a second compressed image frame is stored in the second register. When the data length of the compressed image frame stored in the first register is smaller than the data length of the compressed image frame stored in the second register, a third compressed image frame received next is stored in the first register, otherwise, the third compressed image frame is stored in the second register. After the memory-position selection unit 134 compares all the compressed image frames according to the predetermined sequence, the image selection unit 130 selects the compressed image frame with a larger data length in the first register or the second register to be a target image frame, a still image frame, corresponding to the capturing instruction. Moreover, the apparatus for obtaining a still image frame with anti-vibration clearness of the embodiment can be applied to process more image frames, and it is not limited thereto.

Figure 2:
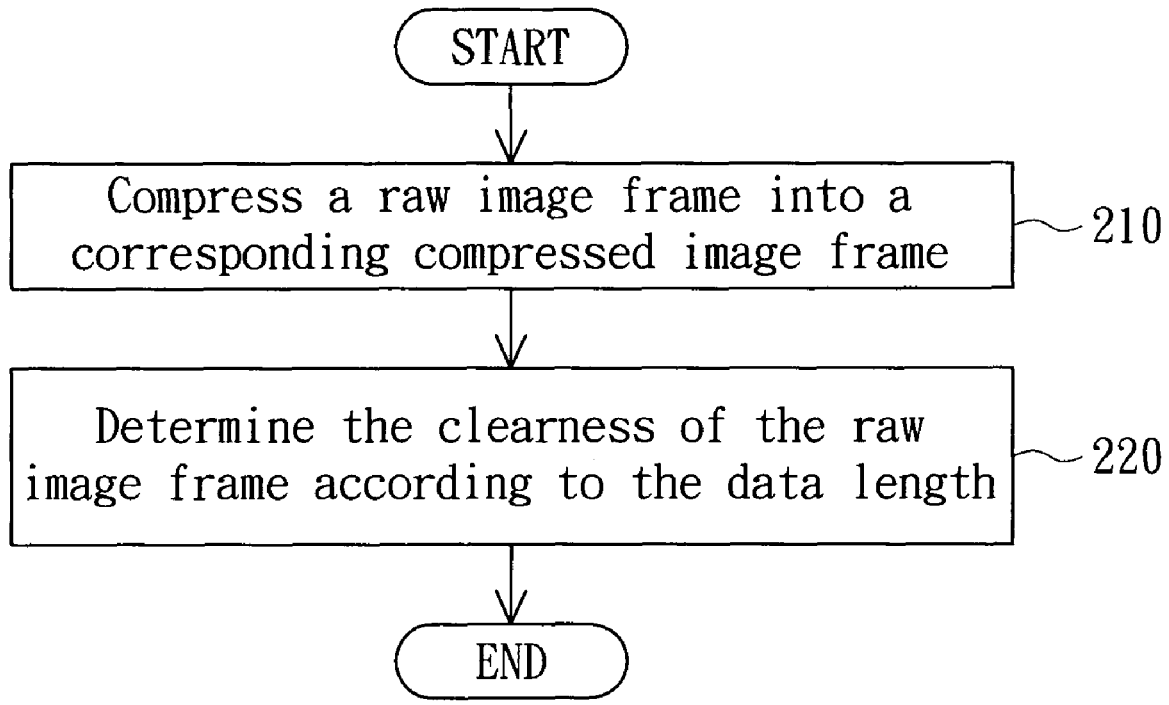
FIG. 2 is a flow chart of a method for obtaining a still image frame with anti-vibration clearness according to the preferred embodiment of the invention.

Referring to FIG. 2, a flow chart of a method for obtaining a still image frame with anti-vibration clearness according to the preferred embodiment of the invention is shown. First, in step 210, a raw image frame is compressed into a corresponding compressed image frame, wherein the compressed image frame has a data length. The image frame is substantially one of a number of image frames obtained by successively photographing a target object during a capturing period under a capturing instruction, and it may be unclear. The step 210 is substantially performed according to the static image compression standard JPEG.

Next, in step 220, the clearness of the raw image frame is determined according to the corresponding data length. In the invention, the data length of the compressed image frame is directly proportional to clearness of the raw image frame. The clearer the raw image frame is, the more high-frequency components the raw image frame has and the larger the data length is. In fact, in the embodiment, the data lengths of the compressed image frames captured successively within the capturing period under the capturing instruction can represent the vibration level of the apparatus as photographing.

Figure 3:
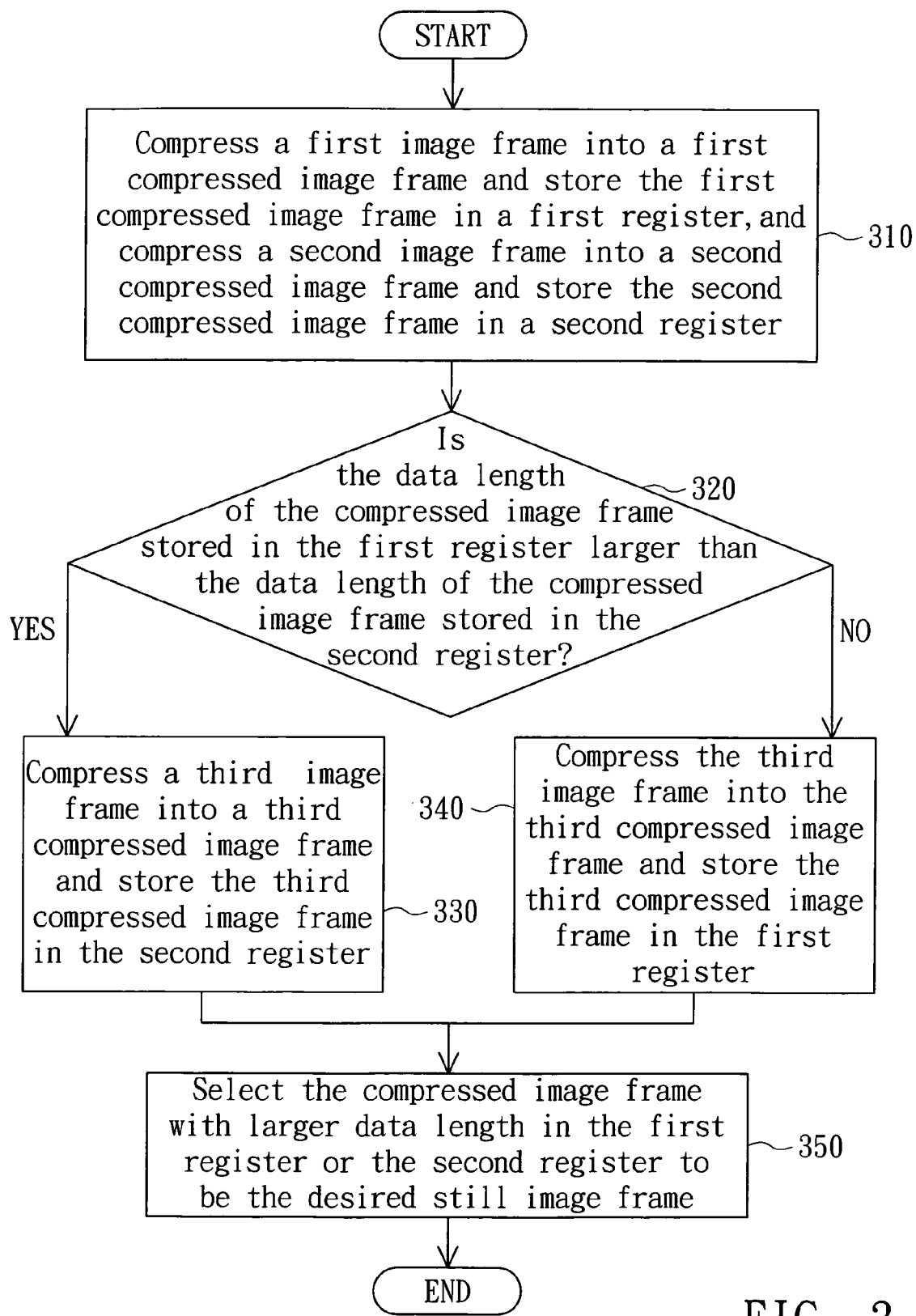
FIG. 3 is a detailed flowchart of the method for obtaining a still image frame with anti-vibration clearness according to the preferred embodiment of the invention.

Referring to FIG. 3, a detailed flowchart of the method for obtaining a still image frame with anti-vibration clearness according to the preferred embodiment of the invention is shown. First, in step 310, a first image frame is compressed into a first compressed image frame and the first compressed image frame is stored in a first register, and a second image frame is compressed into a second compressed image frame and the second compressed image frame is stored in a second register.

Next, in step 320, whether the data length of the compressed image frame stored in the first register is larger than the data length of the compressed image frame stored in the second register is determined. If yes, in step 330, a third image frame (i.e. the next received image frame) is compressed into a third compressed image frame and the third compressed image frame is stored in the second register. If no, in step 340, the third image frame is compressed into the third compressed image frame and the third compressed image frame is stored in the first register.

The multiple image frames compressed in the steps 310, 330 and 340 each can be compressed immediately after being captured or be compressed after they are all captured within the capturing period, and it is not limited thereto.

Afterwards, in step 350, the compressed image frame with a larger data length in the first register or the second register is selected to be the desired still image frame corresponding to the capturing instruction. That is, the data lengths of the compressed image frames are used as an index for determining the vibration level. The clearer the raw image frame is, the more high-frequency components the raw image frame has and the larger the data length is. On the contrary, the less clear the raw image frame is, the less high-frequency components the raw image frame has and the smaller the data length is. The method disclosed by the above embodiment of the invention can be applied to process more image frames.

The method and apparatus for obtaining a still image frame with anti-vibration clearness provided by the invention use a simple way to achieve anti-vibration function without extra analyzing the real context of each whole raw image frame. The method and apparatus for obtaining a still image frame with anti-vibration clearness capture multiple image frames during a short capturing period under a single capturing instruction and use the data lengths of the corresponding compressed image frames as a measurement of the vibration level during photographing and accordingly determine whether the image frames are clear or not for selecting a clearer one from the multiple image frames to be the desired still image frame corresponding to the single capturing instruction, and thus the purpose of vibration reduction is achieved.

Besides, the method and apparatus for obtaining a still image frame with anti-vibration clearness disclosed by the embodiment of the invention, as compared with the prior art, determine the clearness of the raw image frames according to the data lengths of the corresponding image frames without any extra software or hardware as an assistant for selecting the clearest image frame. And the information, "the data lengths of the corresponding compressed image frames", inevitably exists in a digital image capture device. Therefore, the method of the invention can be applied to various digital image capture devices having a compression process in the market in the simplest and most efficient manner.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for obtaining a still image frame with anti-vibration clearness, comprising the steps of:

capturing a plurality of raw image frames successively during a capturing period under a capturing instruction;

compressing the raw image frames respectively, according to a predetermined compression rule, into a plurality of corresponding compressed image frames each of which has a data length after such compression;

storing the compressed image frames according to a predetermined sequence; and comparing the data lengths of the compressed image frames stored according to the predetermined sequence, and based on the comparison, selecting a desired still image frame, according to the compressed image frame among all of the compressed image frames, of which the data length has a unique feature;

wherein the compressed image frames are temporarily stored in a first register and a second register;

the data length of the compressed image frame stored in the first register is compared with the data length of the compressed image frame stored in the second register, to determine in which of the first register and the second register the compressed image frames are stored;

if a first compressed image frame is stored in the first register and a second compressed image frame is stored in the second register, when the data length of the compressed image frame stored in the first register is smaller than the data length of the compressed image frame stored in the second register, a third compressed image frame is stored in the first register, otherwise, the third compressed image frame is stored in the second register.

2. The method according to claim 1, wherein the predetermined sequence is alternative and rolling forward.

3. The method according to claim 1, wherein the predetermined compression rule includes a static image compression standard (JPEG).

4. The method according to claim 1, wherein the unique feature includes the length of the data length of the compressed image frames.

5. An apparatus for obtaining a still image frame with anti-vibration clearness, comprising:

an image capture unit, for capturing a plurality of raw image frames successively during a capturing period under a capturing instruction;

an image compression unit, for compressing the raw image frames respectively, according to a predetermined compression rule, into a plurality of corresponding compressed image frames each of which has a data length after such compression; and an image selection unit, for storing the compressed image frames according to a predetermined sequence, comparing the data lengths of the compressed image frames stored according to the predetermined sequence, and based on the comparison, selecting a desired still image frame, according to the compressed image frame among all of the compressed image frames, of which the data length has a unique feature, wherein the image selection unit includes:

a memory, including a first register and a second register, for temporarily storing the compressed image frames; and a memory-position selection unit, for comparing the data length of the compressed image frame stored in the first register with the data length of the compressed image frame stored in the second register to determine in which of the first register and the second register the compressed image frames are stored;

wherein a first compressed image frame is stored in the first register, a second compressed image frame is stored in the second register, and when the data length of the compressed image frame stored in the first register is smaller than the data length of the compressed image frame stored in the second register a third compressed image frame is stored in the first register, otherwise, the third compressed image frame is stored in the second register.

6. The apparatus according to claim 5, wherein the predetermined sequence is alternative and rolling forward.

7. The apparatus according to claim 5, wherein after the memory-position selection unit compares the compressed image frames, the image selection unit selects the compressed image frame, of which the data length has the unique feature, stored in the first register or the second register to be the desired still image frame.

8. The apparatus according to claim 5, wherein the predetermined compression rule includes a static image compression standard (JPEG).

9. The apparatus according to claim 5, wherein the unique feature includes the length of the data length of the compressed image frames.

* * * * *